United States Patent
Le Jeune et al.

(10) Patent No.: US 10,119,569 B2
(45) Date of Patent: Nov. 6, 2018

(54) METHOD FOR MANUFACTURING A BALL BEARING, NOTABLY FOR A BUTTERFLY VALVE IN AN AERONAUTICAL ENVIRONMENT

(71) Applicants: SKF Aerospace France, Saint-Vallier (FR); Liebherr-Aerospace Toulouse SAS, Toulouse (FR)

(72) Inventors: Gwénolé Le Jeune, Saint Sorlin en Valloire (FR); Yves Maheo, Anneyron (FR); Jérôme Rocchi, Roqueseriere (FR)

(73) Assignees: SKF Aerospace France, Saint-Vallier (FR); Liebherr-Aerospace Toulouse SAS, Toulouse (FR)

( * ) Notice: Subject to any disclaimer, the term of this patent is extended or adjusted under 35 U.S.C. 154(b) by 0 days.

(21) Appl. No.: 14/650,573

(22) PCT Filed: Dec. 18, 2013

(86) PCT No.: PCT/EP2013/077160
§ 371 (c)(1),
(2) Date: Jun. 9, 2015

(87) PCT Pub. No.: WO2014/096047
PCT Pub. Date: Jun. 26, 2014

(65) Prior Publication Data
US 2015/0323009 A1    Nov. 12, 2015

(30) Foreign Application Priority Data

Dec. 21, 2012   (FR) ..................................... 12 62632

(51) Int. Cl.
*F16C 33/62*    (2006.01)
*C22C 38/36*    (2006.01)
(Continued)

(52) U.S. Cl.
CPC ................ *F16C 33/62* (2013.01); *B22F 3/10* (2013.01); *B22F 3/24* (2013.01); *B22F 5/00* (2013.01);
(Continued)

(58) Field of Classification Search
CPC .. F16C 33/62; F16C 2220/20; F16C 2204/66; F16C 33/32; F16C 33/64; B22F 3/10;
(Continued)

(56) References Cited

U.S. PATENT DOCUMENTS 5,108,491 A     4/1992   Matsumoto et al.
7,571,742 B2 †  8/2009   Horner
2012/0199777 A1* 8/2012  Schlarman ............ F16C 19/381
                                                              251/305

FOREIGN PATENT DOCUMENTS

DE    10 2005 022 730 A1    11/2006
DE    10 2010 019 587 A1    11/2011
(Continued)

OTHER PUBLICATIONS

INPI, Rapport de Recherche Préliminaire, FR Patent Application No. 12 62643, Aug. 23, 2013.
(Continued)

*Primary Examiner* — Mary McManmon
*Assistant Examiner* — Patrick Williams
(74) *Attorney, Agent, or Firm* — Soquel Group LLC

(57) ABSTRACT

The manufacturing method notably includes a step (110) for sintering steel powder (10), the chemical composition of which includes, in mass percent, 2.3% of carbon, 4.2% of chromium, 7% of molybdenum, 6.5% of tungsten, 10.5% of cobalt and 6.5% of vanadium, so as to obtain a sintered steel (12) and shaping of the sintered steel (12), for forming a bearing ring (18).

8 Claims, 1 Drawing Sheet

(51) Int. Cl.
  *F16C 33/32* (2006.01)
  *C22C 38/22* (2006.01)
  *C22C 38/24* (2006.01)
  *C22C 38/30* (2006.01)
  *F16K 1/22* (2006.01)
  *B22F 5/00* (2006.01)
  *B22F 3/24* (2006.01)
  *B22F 3/10* (2006.01)
  *F16C 33/64* (2006.01)

(52) U.S. Cl.
  CPC .............. *C22C 38/22* (2013.01); *C22C 38/24* (2013.01); *C22C 38/30* (2013.01); *C22C 38/36* (2013.01); *F16C 33/32* (2013.01); *F16C 33/64* (2013.01); *F16K 1/224* (2013.01); *B22F 2003/247* (2013.01); *B22F 2003/248* (2013.01); *F16C 2204/66* (2013.01); *F16C 2220/20* (2013.01); *Y10T 29/49686* (2015.01)

(58) Field of Classification Search
  CPC ........ B22F 3/24; B22F 5/00; B22F 2003/247; B22F 2003/248; C22C 38/36; C22C 38/30; C22C 38/24; C22C 38/22; F16K 1/224; Y10T 29/49686
  USPC ........................................................ 251/308
  See application file for complete search history.

(56) References Cited

FOREIGN PATENT DOCUMENTS

| | | | |
|---|---|---|---|
| EP | 2517805 | † | 10/2012 |
| JP | 61291946 | A | 12/1986 |
| JP | 03194211 | A | 8/1991 |
| JP | 11210503 | A | 8/1999 |
| JP | 2006329265 | A | 12/2006 |

OTHER PUBLICATIONS

WIPO, International Search Report, PCT Application No. PCT/EP2013/077160, dated Apr. 2, 2014.
Erasteel powder metallurgy HSS ASP*2060, published in 2008, and a revision published in 2012.†
Introduction to Powder Metallurgy, European Powder Metallurgy Association, published in 1992 & 2008.†
A Brief Introduction to Rolling Bearings, Schaeffler Group, published in Jul. 2009.†
MRC Hybrid Ceramic Ball Bearings, MRC Bearing Services, published in 2002.†
Powder Metallurgy Components Production Cycle, European Powder Metallurgy Association, published 1990, 2008.†

\* cited by examiner
† cited by third party

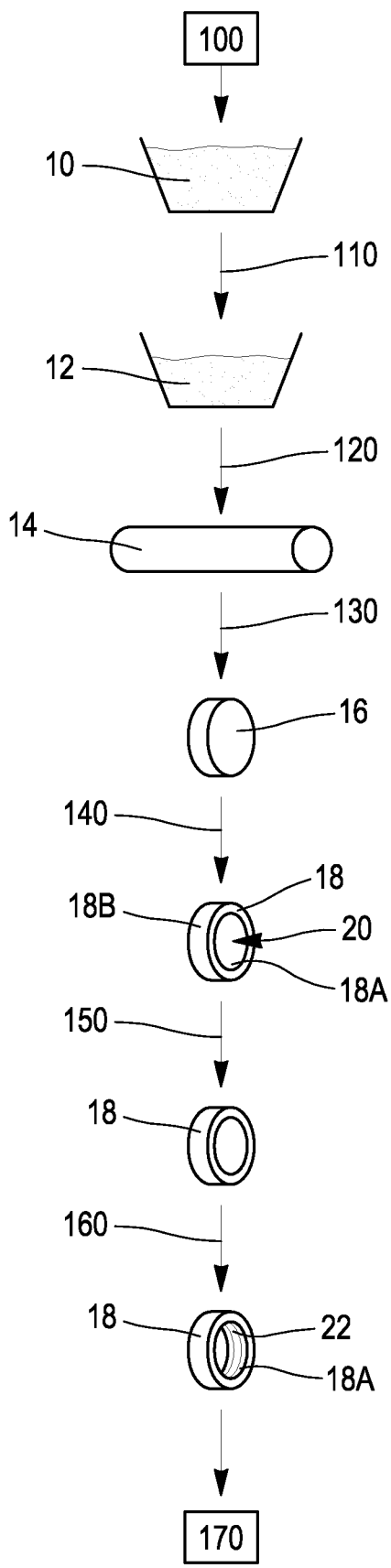

METHOD FOR MANUFACTURING A BALL BEARING, NOTABLY FOR A BUTTERFLY VALVE IN AN AERONAUTICAL ENVIRONMENT

CROSS REFERENCE TO RELATED APPLICATIONS

This application claims benefit under 35 USC § 371 of PCT Application No. PCT/EP2013/077160 entitled A METHOD FOR MANUFACTURING A BALL BEARING, NOTABLY FOR A BUTTERFLY VALVE IN AN AERONAUTICAL ENVIRONMENT, filed on Dec. 18, 2013 by inventors Gwénolé Le Jeune, Yves Maheo and Jérôme Rocchi. PCT Application No. PCT/EP2013/077160 claims priority of French Patent Application No. 12 62632 filed on Dec. 21, 2012.

FIELD OF THE INVENTION

The present invention relates to an enhanced method for manufacturing a ball bearing, notably for a butterfly valve.

BACKGROUND OF THE INVENTION

A ball bearing intended to be used in a butterfly valve for an application in an aeronautical environment is already known in the state of the art. Such a ball bearing generally operates under high loads and at a high temperature, notably when the butterfly valve equips an air conditioning device for an airborne vehicle.

In an aeronautical environment, a bearing is usually subject to strong vibrations. These vibrations, in combination with high temperature, limit the possibility of applying grease in the bearing. Thus, known ball bearings do not generally have satisfactory corrosion and hardness behavior at a high temperature.

SUMMARY OF THE DESCRIPTION

The object of the invention is notably to find a remedy to this drawback, by providing a method for manufacturing a ball bearing having satisfactory performances for the hardness and to the corrosion resistance at high temperatures, i.e. at a temperature of the order of 500° C.

For this purpose, the object of the invention is notably a method for manufacturing a bearing, notably a ball bearing, characterized in that it includes:
  a sintering step for a steel powder, the chemical composition of which includes by mass percent, 2.3% of carbon, 4.2% of chromium, 7% of molybdenum, 6.5% of tungsten, 10.5% of cobalt and 6.5% of vanadium, so as to obtain sintered steel and
  shaping of the sintered steel for forming a bearing ring.

In other words, the bearing rings are made by a powder metallurgy method, powder metallurgy not usually being contemplated by bearing manufacturers.

The aforementioned chemical composition corresponds to a steel grade designated by the name of ASP® 2060 and marketed by ERASTEEL. Such a steel grade has both high hot hardness and good resistance to wear and tear.

With the method according to the invention it is possible to exceed the performances obtained with bearings made by conventional methods, notably by reducing the grain size by means of the fineness of microstructures of nano-agglomerated powders, and accordingly by reducing the defects. Moreover, such a finer microstructure involves the absence of carbide of great dimensions, while such carbides, conventionally used in the state of the art, usually lower the properties of resistance to wear and tear and absorb the alloy elements which ensure the corrosion resistance properties. Finally, it should be noted that the use of powder metallurgy, and more particularly of a steel grade as defined earlier, is not usually part of the general skills of a bearing manufacturer.

A method according to the invention may further include one or several of the following features, taken alone or according to all the technically possible combinations:
  the shaping includes:
    a step for hot rolling the sintered steel, in order to form a steel bar,
    a step for cutting the steel bar, for forming a steel washer, the dimensions of which are substantially equal to predetermined dimensions of the bearing ring to be made,
    a step for machining the steel washer, for forming the bearing ring, so as to give it a general annular shape having an inner surface and an outer surface;
  it includes, subsequently to the machining step, a step for heat treatment of the bearing ring;
  it includes, subsequently to the heat treatment step, a step for rectifying the inner and outer surfaces of the bearing ring, in order to give it a predetermined shape and predetermined final dimensions.

The invention also relates to a bearing, notably a ball bearing, including an annular outer ring and an annular inner ring which are substantially coaxial with each other, and balls extending radially between the outer ring and the inner ring, characterized in that at least one of the outer and inner rings, preferably both rings, is in sintered steel, the chemical composition of which includes in mass percent, 2.3% of carbon, 4.2% of chromium, 7% of molybdenum, 6.5% of tungsten, 10.5% of cobalt and 6.5% of vanadium.

Advantageously, each ball is in ceramic.

The invention finally relates to a butterfly valve notably for an application in aeronautics, including a conduit body with a circular section, a valve with a circular shape mating that of the section of the conduit body, the valve being rotatable around a pivot connection of an axis diametrically crossing the circular section of the conduit body, characterized in that the pivot connection includes at least one bearing according to the bearing shown above.

BRIEF DESCRIPTION OF THE DRAWINGS

The invention will be better understood upon reading the description which follows, only given as example and made with reference to the appended single FIGURE, schematically illustrating the steps of a method for manufacturing a ball bearing according to an exemplary embodiment of the invention.

DETAILED DESCRIPTION

This method is applied with view to manufacturing a ball bearing, the dimensions and shape of which are predetermined. In particular, the ball bearing includes an inner ring and an outer ring, each having a general annular shape around a longitudinal axis, delimited by an inner circumferential surface and an outer circumferential surface, the dimensions of which, notably a longitudinal height, an inner diameter and an outer diameter are predetermined.

The method according to the invention includes a preliminary step 100 for providing steel powder 10, the chemical composition of which includes, in mass percent, 2.3% of carbon, 4.2% of chromium, 7% of molybdenum, 6.5% of tungsten, 10.5% of cobalt and 6.5% of vanadium. For example, the steel powder is a powder of a steel grade designated under the name of ASP® 2060, marketed by ERASTEEL.

According to a conventional powder metallurgy method, the method includes a step 110 for sintering said steel powder. This sintering step 110 is for example achieved by hot isostatic compaction of the steel powder. During this sintering step 110, the grains of the steel powder are firmly attached together under the effect of heat and of pressure. The steel obtained at the end of the sintering step 110 will be called «sintered steel 12» below.

The method then includes a step 120 for rolling the sintered steel 12, in order to form a steel bar 14. This rolling 120 is calibrated so that the steel bar 14 has a diameter greater than or equal to the predetermined outer diameter of the outer ring of the ball bearing.

Thus, this same steel bar 14 may be used for manufacturing the outer ring, as well as for manufacturing the inner ring, the outer diameter of which is less than that of the outer ring.

Alternatively, a first steel bar may be formed by rolling so as to have a diameter substantially equal to the predetermined outer diameter of the outer ring, and a second steel bar may be formed by rolling so as to have a diameter substantially equal to the predetermined outer diameter of the inner ring.

The method then includes a step 130 for cutting the steel bar 14, so as to form a washer 16 with dimensions substantially greater than or equal to the predetermined dimensions of the bearing ring to be made. In particular, the washer has a same height in the longitudinal direction as the ring of bearings to be made.

The method then includes a step 140 for machining the steel washer 16, in order to form the ring of bearings 18. In particular, the machining is carried out so as to give an annular shape to the ring of bearings 18, while forming a central orifice 20 in the washer so as to delimit a circumferential inner surface 18A. The circumferential outer surface 18B is also machined for rectifying the outer diameter of the ring 18, so that its diameter is substantially equal to the predetermined diameter.

When the same steel bar 14 is used for making the outer ring and the inner ring, a first washer is machined in order to form the outer ring and a second washer is machined in order to form the inner ring. The outer surface of the second washer is notably machined in order to reduce the outer diameter thereof, until a diameter substantially equal to the predetermined outer diameter of the inner ring is obtained.

The method then includes a step 150 for heat treatment, intended to give the ring 18 optimum properties in hardness and in resistance to wear and tear.

This heat treatment step for example includes mild annealing in a protective and controlled atmosphere, at a temperature comprised between 850 to 900° C. for three hours, followed by slow cooling of 10° C. per hour, for example in the open air, down to a temperature of 700° C. The heat treatment then includes detensioning annealing at a temperature comprised between 600 to 700° C. for about two hours, and then slow cooling down to 500° C.

The heat treatment then includes quenching, in a protected atmosphere, with preheating in two stages, notably a first stage at a temperature comprised between 450 and 500° C., and a second stage at a temperature comprised between 850 and 900° C., and then austenitization at a temperature selected according to the hardness to be obtained, followed by cooling down to a temperature comprised between 40 to 50° C.

Finally, the heat treatment includes three annealings of at least one hour at a temperature of 560° C., each annealing being followed by cooling down to room temperature (25° C.).

Finally, the manufacturing method includes a step 160 for rectification in order to give the rolling ring 18 its predetermined final shape and final dimensions.

In particular, during this rectification step 160, a rolling track 22 is made for the balls on the inner surface 18A of the ring 18, if this is an outer ring (as this is illustrated in FIG. 1), or on the outer surface of the ring, if this is an inner ring.

The steps described above allow the manufacturing of an inner ring or an outer bearing ring.

The manufacturing method then includes a step 170 for assembling an inner ring and an outer ring, each manufactured by the steps described earlier, with balls, for example ceramic balls, inserted between the inner ring and the outer ring, in the rolling tracks of these rings.

This assembling step 170 which is conventional and which will therefore not be further described, thus gives the possibility of obtaining a ball bearing.

Alternatively, only one of the outer or inner rings is obtained by means of the steps described earlier, the other ring being obtained with a conventional method.

The method described earlier therefore gives the possibility of obtaining a ball bearing, including an annular outer ring 18 and an annular inner ring substantially coaxial with each other, and balls extending radially between the outer ring and the inner ring, wherein at least one of the outer and inner rings, preferably both rings, is in sintered steel, the chemical composition of which includes in mass percent, 2.3% of carbon, 4.2% of chromium, 7% of molybdenum, 6.5% of tungsten, 10.5% of cobalt and 6.5% of vanadium.

Such a ball bearing has satisfactory properties relatively to its high temperature hardness and to its corrosion resistance.

Such a ball bearing may therefore be used for manufacturing a butterfly valve for an aeronautical application, for example for manufacturing a butterfly valve for an air conditioning device, for an aeronautical application.

Such a butterfly valve conventionally includes a conduit body with a circular section, and a valve of circular shape mating that of the section of the conduit body, this valve being rotatable around a pivot connection of an axis substantially diametrically passing through the circular section of the conduit body. In this case, the pivot connection includes at least one ball bearing as described earlier.

It will be noted that the invention is not limited to the embodiment described earlier, but may have various alternatives without departing from the scope of the claims.

The invention claimed is:

1. A method for manufacturing a ball bearing of a butterfly valve for an aeronautical application, comprising:
   sintering a steel powder, the chemical composition of which includes in mass percent, 2.3% of carbon, 4.2% of chromium, 7% of molybdenum, 6.5% of tungsten, 10.5% of cobalt and 6.5% of vanadium, so as to obtain a sintered steel;
   shaping the sintered steel, to form a bearing ring of the butterfly valve of an aeronautical application, comprising:
      rolling the sintered steel, to form a steel bar;
      cutting the steel bar, to form a steel washer;

and machining the steel washer, to form the bearing ring, so as to give it an annular general shape having an inner surface and an outer surface;

and assembling the ball bearing, the ball bearing comprising said bearing ring and a plurality of balls.

2. The manufacturing method according to claim 1, comprising, subsequent to said machining, heat treatment of the bearing ring.

3. The manufacturing method according to claim 2, comprising, subsequent to said heat treatment, rectification of the inner and outer surfaces of the bearing ring, so as to give it a predetermined shape and predetermined final dimensions.

4. A method for manufacturing a butterfly valve for an aeronautical application, comprising
   manufacturing a ball bearing, comprising:
       sintering a steel powder, the chemical composition of which includes in mass percent, 2.3%/of carbon, 4.2%/of chromium, 7%/of molybdenum, 6.5%/of tungsten, 10.5%/of cobalt and 6.5%/of vanadium, so as to obtain a sintered steel;
       shaping of the sintered steel, for forming a bearing ring of the butterfly valve of an aeronautical application, comprising:
           rolling the sintered steel to form a steel bar;
           cutting the steel bar to form a steel washer;
           and machining the steel washer to form the bearing ring, so as to give it an annular general shape having an inner surface and an outer surface;
       and assembling the ball bearing in the butterfly valve, the ball bearing comprising the bearing ring and a plurality of balls.

5. The manufacturing method according to claim 4, comprising, subsequent to said machining, heat treatment of the bearing ring.

6. The manufacturing method according to claim 5, comprising, subsequent to said heat treatment, rectification of the inner and outer surfaces of the bearing ring, so as to give it a predetermined shape and predetermined final dimensions.

7. A method for manufacturing a ball bearing of a butterfly valve for an aeronautical application, comprising:
   sintering a steel powder, the chemical composition of which includes in mass percent, 2.3% of carbon, 4.2% of chromium, 7% of molybdenum, 6.5% of tungsten, 10.5% of cobalt and 6.5% of vanadium, so as to obtain a sintered steel;
   shaping the sintered steel, to form a bearing ring of the butterfly valve of an aeronautical application having satisfactory hardness and corrosion resistance at temperatures on the order of 500 degrees C., comprising:
       rolling the sintered steel, to form a steel bar;
       cutting the steel bar, to form a steel washer;
       machining the steel washer, to form the bearing ring, so as to give it an annular general shape having an inner surface and an outer surface;
   and heat treatment of the bearing ring, comprising:
       mild annealing for approximately three hours in a protected atmosphere at a temperature between 850 degrees C. and 900 degrees C.;
       slow cooling of approximately 10 degrees C. per hour in open air, to a temperature of approximately 700 degrees C.;
       detensioning annealing for approximately two hours at a temperature between 600 degrees C. and 700 degrees C.; slow cooling down to a temperature of approximately 500 degrees C.;
       quenching in a protected atmosphere with pre-heating in two stages, namely, a first stage at a temperature between 450 degrees C. and 500 degrees C., and a second stage at a temperature between 850 degrees C. and 900 degrees C.;
       austenization at a temperature based on a desired hardness; cooling down to a temperature between 40 degrees C. and 50 degrees C.; annealing of at least one hour at a temperature of approximately 560 degrees C.; and cooling down to room temperature;
   and assembling the ball bearing, the ball bearing comprising said bearing ring and a plurality of balls.

8. The manufacturing method according to claim 7, comprising, subsequent to said heat treatment, rectification of the inner and outer surfaces of the bearing ring, so as to give it a predetermined shape and predetermined final dimensions.

* * * * *